United States Patent [19]

Slomianny

[11] Patent Number: 4,862,192

[45] Date of Patent: Aug. 29, 1989

[54] INK SYSTEM FOR INK JET MATRIX PRINTER

[76] Inventor: Jan Slomianny, Am Sonnenhang 33, D-5223 Nümbrecht, Fed. Rep. of Germany

[21] Appl. No.: 167,405

[22] Filed: Mar. 14, 1988

[30] Foreign Application Priority Data

Mar. 13, 1987 [DE] Fed. Rep. of Germany ....... 3708120

[51] Int. Cl.[4] ............................................ G01D 15/18

[52] U.S. Cl. .................................. 346/75; 346/140 R

[58] Field of Search ........................ 346/75; 239/3, 708

[56] References Cited

U.S. PATENT DOCUMENTS 4,527,170 7/1985 Iwasari et al. ........................ 346/75

4,658,268 4/1987 Needham ............................ 346/1.1

*Primary Examiner*—E. A. Goldberg

*Assistant Examiner*—Gerald E. Preston

*Attorney, Agent, or Firm*—Steele, Gould & Fried

[57] ABSTRACT

The ink jet matrix printer, with an ink system, includes a transport device for transferring thick ink from a first supply container and, independently thereof, solvent from a second supply container, into an ink chamber. Ink from this ink chamber is supplied under pressure to a write head. Ink is returned into the ink chamber via a collection channel, located across from the write head and intended for ink droplets which have not been diverted for writing purposes. The transport device uses pressurized air to transport the ink between an ink container, connected to the write head, a mixer container, connected to the tawo supply containers, and a collection container, connected to the collection channel. The mixer container can alternatively be connected to a suction line or a pressure line.

7 Claims, 2 Drawing Sheets

INK SYSTEM FOR INK JET MATRIX PRINTER

The invention refers to an ink jet matrix printer with an ink system, in which, by means of a transport device: optionally, thick ink from a first supply container and, independently thereof, solvent from a second supply container is fed into an ink chamber, ink from this ink chamber is supplied under pressure to a write head, and ink is returned into the ink chamber via a collection channel, located across from the write head and intended for ink droplets which have not been diverted for writing purposes.

BACKGROUND

In the previously known ink systems for ink jet matrix printers, the transport device has mechanically functioning pumps, e.g. membrane pumps or toothed wheel pumps. In some ink jet matrix printers, at least one mechanically functioning transport pump is used, by means of which the ink is transported from the ink chamber to the write head, and in addition, at least one suction pump is provided, by means of which droplets that have not been diverted for writing purposes are returned from the collection channel into the ink chamber. However, there are also ink systems which function with only one mechanically functioning pump, e.g. a membrane pump, whereby this sole pump generates pressure (in one direction) as well as negative pressure (in the other working direction).

However, the previously known ink systems equipped with mechanically functioning pumps have the disadvantage that the pump will eventually be worn down, i.e. that maintenance is required. In a mechanical pump, the moving parts as well as the sealing parts will eventually be worn out, so that disturbance-free operation is not possible for longer periods of time. In addition, the costs for such mechanical pumps is significant, which is noticeably reflected in the price of the ink system. Finally, problems will occur in mechanically functioning pumps when pigmented inks are used. For instance, if one should want to use white inks, one is forced to work with pigmented inks. Pigmented inks are mixtures consisting of two materials, namely small color particles and a liquid which does not constitute a solvent for the small color particles. In mechanical pumps, the small pigment particles of the pigmented inks will, over the long run, clog areas of the pump, so that its mechanical function is eventually disturbed thereby. A cleaning is extremely complicated and always requires a great amount of work.

Ink jet matrix printers are known in principle, e.g. from the German Disclosure Document 23 44 453 or the old US Patent 3 596 275.

OBJECTS AND SUMMARY

On the basis of the previously known ink jet matrix printers, the purpose of the invention is to indicate an ink system which functions without mechanically moved pumps, thus economical, to a great extent maintenance-free, and also suitable for pigmented inks.

On the basis of the ink jet matrix printer with an ink system of the type mentioned above, this problem is solved thereby that the ink chamber is subdivided into:

- an ink container connected to the write head,
- a mixer container connected with the two supply containers, and
- a collection container connected with the collection channel, that the transport device is operated by means of pressurized air, can be connected to a source of pressurized air, and has a suction jet pump, that the ink container is connected to a pressurized line and under pressure, and that it is connected with the mixer container via a connection line, that the mixer container can be connected, alternatively, either with the suction jet pump via a suction line or with a pressure line, and that the collection container is connected with the suction jet pump by means of a suction line and with the mixer container by means of a run-off line which can be blocked.

This ink system has a transport device which is operated exclusively by means of pressurized air. The air under pressure is used directly in order to maintain an excess pressure in at least one of the containers, so that liquid is transported out of it under pressure. However, it is also used indirectly, whereby it drives a suction jet pump or a similar vacuum generator working without movable parts. The negative pressure generated thereby is also used for transport purposes.

With this system, mechanically functioning pumps are not provided, nor are they necessary. The ink system is characterized by being largely maintenance-free, by reliable operation with uniform quality even over longer periods of time, and by a favorable production price. There is no more sedimentation of pigment particles on moving parts. The heat transfer to the pumped ink from the pumps heating up during operation, which is practically impossible to avoid with mechanically functioning pumps, is also eliminated. The viscosity of the ink and, consequently, the quality of the printing, are influenced by the introduction of heat.

By subdividing the previously known ink chamber into three separate containers, each important transport function of the ink system is allocated to a separate container. This makes it possible to adjust it precisely to the applicable transport function, and to effectively control the entire system as well as to monitor it more closely, e.g. with respect to the viscosity of the ink.

In a preferred further development of the invention, the outlet of the suction jet pump is located in a separator, e.g. a water bath. This has the advantage that solvent vapors and other gaseous contaminations carried along in the suction can be removed in the separator and thus do not appear in a hazardous, smelly, or otherwise disturbing form. Thus, the system is practically completely closed and is accessible, i.e. it can be regarded as 'open' only in the area between the write head and the collection channel.

The viscosity control of the ink system is particularly advantageous and is, with respect to inventiveness, not related to the described transport device which is exclusively operated by means of pressurized air. The viscosity is first defined in two different measurement steps: the connection line between the mixer container and the ink container has a calibrated passage. If ink is transported from the mixer container into the ink container, then the time can be measured which is necessary in order to transfer a predetermined volume of ink into the ink container. The volume is determined by means of two level switches in the ink container. The viscosity can be determined on the basis of the time. The viscosity of the ink can be varied depending on the achieved measurement result, namely so that more thick ink or more solvent is fed into the mixer container.

In addition, the viscosity can also be precisely determined thereby that the flow of droplets between the write head and the collection channel is electrically determined. The duration of the passage of an ink droplet between the charge electrode and the collection channel can be determined thereby that the charging of the droplets is abruptly interrupted at a specific time and it is observed how long the electrical current carried by the ink droplets and flowing out of the collection channel remains greater than zero. The time between the disconnection of the charge and the drop-off of the electrical current at the collection channel equals the travel time of the ink droplets.

The number of ink droplets per time unit can be determined by means of the charge impulse per time unit which is received by the collection channel from the charged ink droplets collected there.

A precondition for these described measurement procedures is always that the diversion of the ink droplets is disconnected during the measurement.

The described measurement procedure makes it possible to very precisely determine the speed and number of the droplets, which, in turn, makes it possible to precisely calculate the viscosity. The time required for the measurement procedure is also very short; for instance, the measurement can be taken during the pause between the printing of two symbols. This makes very precise measuring values of the viscosity available within relatively short time, so that the mixture in the mixing chamber can be relatively rapidly adjusted to the conditions of the moment (ambient temperature, etc.) and so that it is always ascertained that the printing is carried out with an ink in the most favorable viscosity range.

The instrumental requirement for the described procedure is an electrically insulated arrangement of the (metallic) collection channel so that the electrical droplet charge taken up by the collection channel can be determined quantitatively and with respect to time by means of a current meter.

It has been found to be very advantageous to expel an air flow from the write head parallel with the flow of the ink droplets. If this is done, the droplets do not move in still-standing air, but they fly with the air flow which preferably moves at the same speed. This makes is possible to avoid mutual shadow effects between individual droplets and, consequently, varying speeds; the printing quality is clearly improved, and the distance between the write head and the object to be printed upon can be relatively great. Furthermore, the print quality is not affected by air draft, lateral air flows, etc.

Finally, it has been found very advantageous to equip the write head with interchangeable nozzle plates, i.e. the nozzle openings are no longer provided in an ink chamber in the write head but in a plate, preferably cap-shaped nut which can be removed, e.g. screwed off, from the write head without disassembly of other parts. This makes it possible to rapidly replace obstructed nozzles. Further, one may select larger or smaller nozzle openings, whereby larger nozzle openings give larger printing dots, while smaller nozzle openings produce smaller droplets and consequently smaller printing dots.

BRIEF DESCRIPTION OF THE DRAWINGS

Additional advantages and characteristics of the invention can be seen from the following description of an example of the invention, which example is not to be understood restrictively. This will be explained in greater detail in the subsequent description and described with reference to the drawing, which shows.

DETAILED DESCRIPTION

Figure 1:
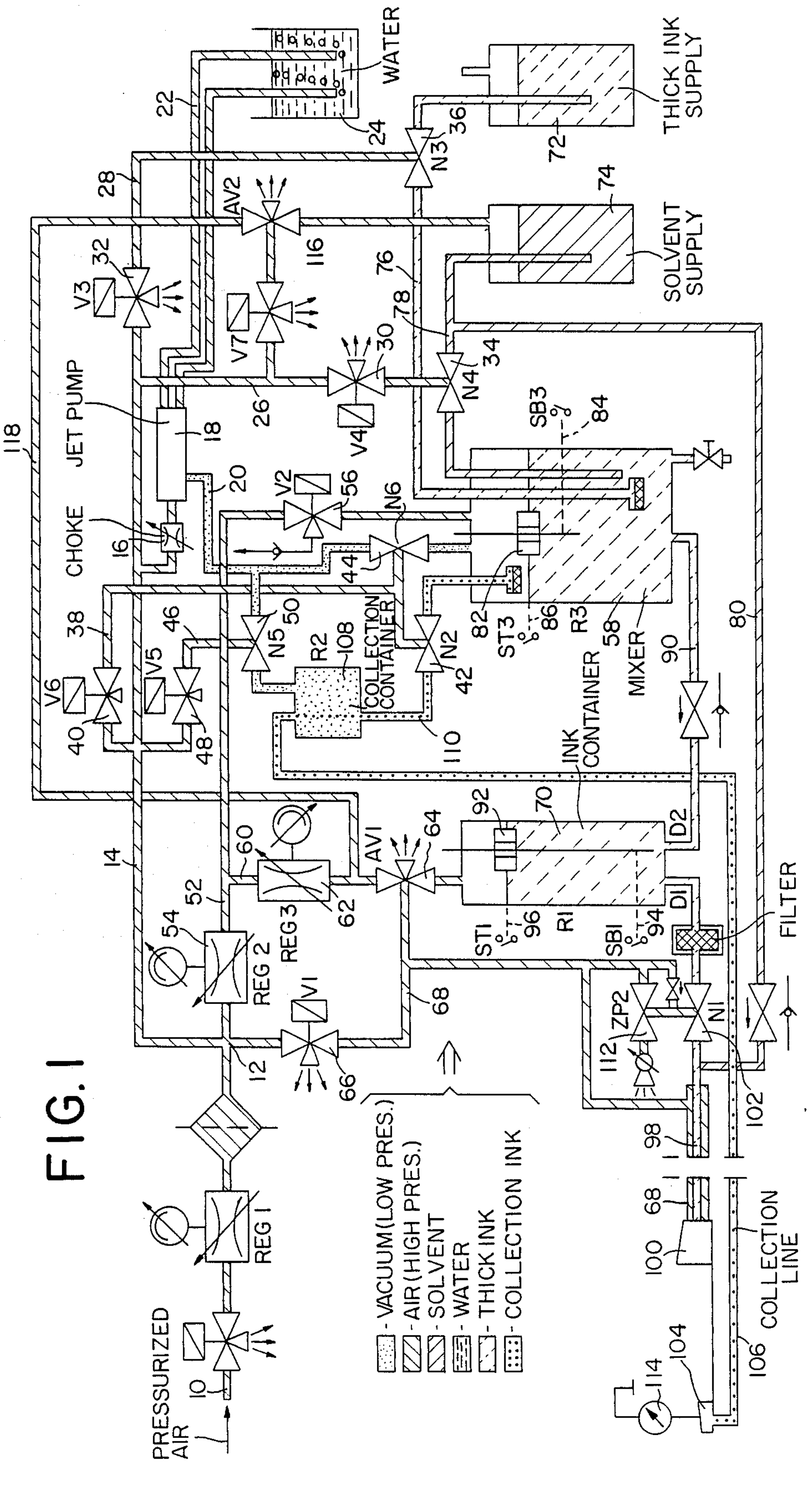
FIG. 1 a schematic switching diagram of the ink system.

The arrangement shown in the diagram according to FIG. 1 has a connection 10 for the pressurized air, over which the pressurized air is fed into the system at a pressure of e.g. 7 bar, namely via an electrical valve, a first pressure control (REG1), and an air filter. The air, which is now under a slightly lesser pressure, flows into three different lines from a branching point 12. A vacuum pump, in this case designed as a jet pump 18, is fed by an upper line 14 with the highest system pressure, namely via an adjustable choke 16. Like a water jet pump, the pressurized air flowing through it tears along air particles from a negative pressure line 20, i.e. it produces a negative pressure there, and flows off via at least one exit line 22 ending in a water bath 24 that functions as a separator.

Two additional lines, 26 and 28, branch off from the line 14 and each one of them accommodates an electric valve, 30 (V4) resp. 32 (V3), which in turn controls a pneumatic valve 34 (N4) resp. 36 (N3). In principle, ink-transporting lines are only equipped with pneumatic valves, which, in turn, are controlled by electrical valves (as in the case of the valve pairs 30, 34, resp. 32, 36). Hereby, one prevents transfer into the ink or another liquid of the heat lost at the electrical valves. Particularly, however, there is a reduction of the flammability and the explosion danger, since flammable substances are typically used as solvents.

Finally, from line 14 another line 38 branches off into which is inserted an electrical valve 40 (V6) controlling two pneumatic valves 42, (N2) 44, (N6) as well as a line 46, into which is inserted an electrical valve 48 (V5) controlling a pneumatic valve 50 (N5).

Branching off from the dividing point 12 is also a line 52, into which a second pressure control is inserted. Its output side pressure is e.g. 4 bar. An electrical valve 56 (V2) is inserted into the line 52; the line 52 opens into the air space of a mixer container 58. Branching off from the line 52 is a line 60, into which a third, high precision pressure control 62 is inserted. In the line 60, there is a pneumatic valve 64, controlled by an electrical valve 66, which is located in the third line branching off from the dividing point 12, namely line 68. The line 60 opens into the air space of an ink container 70. Due to the triple pressure control, the air pressure there remains set very precisely at e.g. 3.5 bar.

The thick tint required for mixing the ink in the mixer container 58 is located in a supply container 72, designed as an easily replaced cartridge; the related solvent is in a cartridge of the same type, in the form of a supply container 74. The design is such that a maximum of two connections are required for each supply container.

The supply container 72 for thick ink is connected to the liquid space in the mixer container 58 by means of a line 76, in which the pneumatic valve 36 is located. Similarly, the supply container 74 for solvent is connected with the liquid space of the mixer container 58 by means of a line 78, in which the pneumatic valve 34 is located. However, an addition flush line, which will be discussed later, branches off from the line 78 ahead of the valve 34.

If there is a negative pressure in the air space of the mixer container 58, which is caused by opening the valve 44 located in the negative pressure line 20 (the negative pressure line 20 opens into the air space of the mixer container 58), thick ink or solvent can be optionally suctioned into the mixer container 58 via line 76 resp. 78, when the valve 34, resp. the valve 36 is open. This is how the introduction of thick ink or solvent into the mixer container is achieved. The control of this supply is achieved by means of a computer (not illustrated). By observing the movement of a floater 82, located in the mixer container 58, one establishes if liquid is actually suctioned from the applicable supply container 72 resp. 74 or if the applicable container is empty.

If the desired mixture of thick ink and solvent has been produced in the mixer container 58, and if the latter has been sufficiently filled, the two valves 34, 36 are closed. The fill level of the mixer container 58 is established by means of two level switches 84, 86, which are located at different levels and, in combination, form a level measurement device.

At its lowest point, the mixer container 58 is connected to the lowest point of the ink container 70 by means of a connecting line 90. A non-return valve is built in and allows a liquid flow only from the mixer container 58 to the ink container 70. In the ink container, there is also a floater 92, which, in combination with two level switches 94, 96, constitutes a level measurement device. If it is established by means of this device that the ink container 70 must be filled, the valves 42 and 44 are also closed. The valve 56, which has so far been closed, is now opened so that the air space of the mixer container 58 can be filled via the line 52 with pressurized air at a pressure of e.g. 4 bar. Since the pressure in the ink container 70 is only 3.5 bar, the pressure different causes ink to be pressed from the mixer container 58 through the connecting line 90 into the ink container 70.

During this process, the time is measured which is required to fill the ink container 70 from the lower level of the level switch 94 to the level of the level switch 96. The connection line 90 is calibrated, e.g. it has an area with a precisely predetermined inside diameter. The viscosity of the transported ink can be established on the basis of the measured filling time.

When the ink container 70 is filled to the level of its upper level switch 96, the valve 56 is closed again, and the filling of the ink container 70 is completed.

The ink container 70 is connected to the write head 100 via an ink line 98. The line 98 is connected in the lowest area of the ink container 70, and it contains an ink filter and a pneumatic valve 102 for rapid closing. The ink, which is under a pressure of 3.5 bar, is expelled in the write head 100, droplets are formed in the known manner and charged in this process, and the droplets that have been formed are electrostatically diverted. Droplets not required for the printing process arrive into a collection channel 104, which is made of metal and electrically insulated from the other parts. A collection line 106 is connected to the collection channel 104 and opens into a collection container 108. Via a valve 50, the latter is connected to a negative pressure line 20, so that there is a negative pressure in it. Because of this, the ink droplets captured in the collection channel, together with accompanying air, are suctioned through the collection line 106 and fall into the collection container 108. Via a line 110 that ends in the air space of the mixer container 58, they pass from there into the mixer container 58, but only when the valve 42 is open. As described above, the valve 42 is opened when there is a negative pressure in the air space of the mixer container 58, but it is closed when the valve 56 is open and there is excess pressure in the mixer container 58. During this excess pressure period, the collected ink remains in the collection container 108; the latter has a correspondingly sufficient volume. The collected ink does not flow into the mixer container 58 until there is again a negative pressure condition in this container.

Parallel to the ink line 98, an end branch of the line 68 opens into the write head 100 and provides the latter with pressurized air. This pressurized air flows parallel with the flow of ink droplets and to the extent possible, it moves at the same speed as the latter.

The valve 102 is also controlled by the valve 66, although by means of an additional back-pressure valve. As soon as the valve 66 is closed, the valve 64 will close, and the pressure in the ink container 70 is reduced as rapidly as possible. The valve 102 closes as near to simultaneously as possible, so that delayed dripping of ink from the write head 100 is prevented. The rapid disconnection is supported by the described back-pressure valve and an additioal pneumatic valve 112. The design is such that pressure at the location of the valve 102 is reduced as rapidly as possible.

The liquid droplets that have been electrically charged by the charge electrode arrive in the collection channel 104, unless they have been deflected for printing purposes. In this channel, they are noticeable on one hand as liquid, on the other hand as electrical charge, introduced "package-wise". This charge is recognized over time by means of a current meter 114. If the process of charging the liquid droplets is abruptly interrupted (in case of an assumed deflection to the collection channel 104), charged liquid droplets will continue to flow until the first droplet without a charge reaches the collection channel 104. The corresponding time span can be used to determine the flow time. The viscosity of the ink can be determined very precisely on the basis of the number of droplets and the flow time, and the obtained measurement values are taken into consideration in the preparation of the ink from thick ink and solvent, which takes place in the mixer container 58.

Between the valve 102 and the write head 100, the rinse line 80 opens into the ink line 98; a back pressure valve is inserted into the rinse line. If the valve 102 is closed, the pressure in the ink line 98 drops rapidly. Simultaneously, a pneumatic valve 116 has been opened, which is located in a line 118 that connects the exit of the third pressure control 62 with the air space of the supply container 74 for solvent. Thereby, his pressurized container is affected by a pressure of 3.5 bar. As long as the same pressure is maintained in the ink line 98, no solvent located in the rinse line 80 can enter the ink line 98. However, as soon as the pressure has dropped in this line, solvent is introduced from the rinse line 80, and the write head is rinsed and cleaned.

Figures 2, 3:
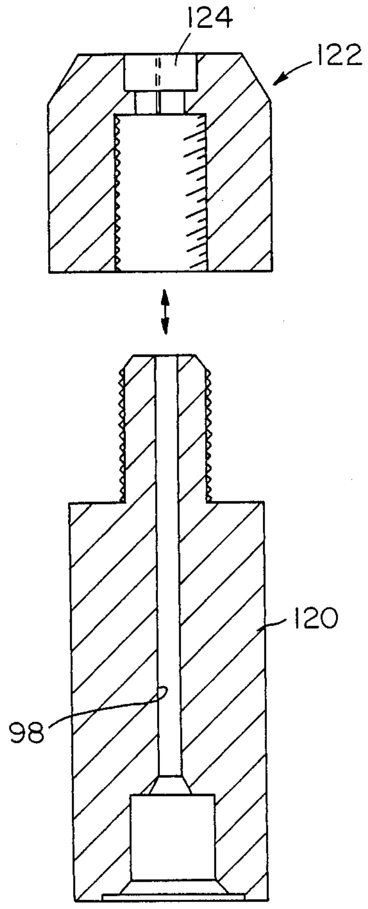
FIG. 2 a section through the nozzle area of a write heat.
FIG. 3 a section of a nut-shaped attachment piece with an exit nozzle.

FIG. 2 shows a tube section 120 of a write head 100; an ink line 98 can be screwed onto (the bottom of) this tube section by means of a clamp-cone connection. The tube section 120 has an outside threading in the end area at the top of the figure. The cap 122 with inside threading, which is shown in FIG. 3, can be screwed onto this section. A nozzle 124 is provided inside the cap. The illustrated arrangement allows rapid exchange of a nozzle from the tube section 120 of a write head 100. Other executions with rapidly exchangeable nozzles are possible.

I claim:

1. In an ink jet matrix printer comprising an ink system having a fluid transport device which optionally, transports thick ink from a first supply container into an ink chamber and, independently thereof, feeds solvent from a second supply container into the ink chamber; supplies ink from this ink chamber under pressure to a write head; and returns ink formed of ink droplets not diverted for writing purposes, from a collection channel into the ink chamber, the collection channel is located across from the write head;

wherein the improvement comprises:

the transport device is exclusively operated by means of pressurized air, has a connection to a source of pressurized air, and has a suction jet pump;

the ink chamber includes:

an ink container fluidly connected with the write head;

a mixer container which is fluidly connected with the said two supply containers; and a collection container fluidly connected to the collection channel;

the ink container is connected to a first air pressure line and the ink therein is under pressure, the ink container fluidly connected to the mixer container by means of a connection line;

that the mixer container is connected via a suction line alternatively to the suction jet pump or to a second pressure line; and, that the collection container is connected with the suction jet pump via a line with negative pressure, and with the mixer container via a run-off line, and a valve controlling flow in said run-off line.

2. Ink jet matrix printer according to claim 1, characterized in that the suction jet pump (20) is provided with an exit line (22), which opens into a separator, including a water bath (24).

3. Ink jet matrix printer according to claim 1 or 2, characterized in that a pressure control device (62), designed for a precise pressure setting, is arranged in the first pressure line for the ink container (70).

4. Ink jet matrix printer according to one of the claims 1 or 2, characterized in that a level metering device with floater (82, resp. 92) and two level switches located at different levels (84, 86, resp. 94, 96) is provided in the mixer container (58) or in the ink container (70).

5. Ink jet matrix printer according to one of the claims 1 or 2, characterized in that the connection line (90) between the mixer container (58) and the ink container (70) has a calibrated cross section for the flow.

6. Ink jet matrix printer according to one of the claims 1 or 2, characterized in that the write head (100) has an air nozzle oriented parallel to and preferably concentrically with the flow of the ink droplets.

7. Ink jet matrix printer according to one of the claims 1 or 2, characterized in that the collection channel (104) is electrically insulated from the other parts and is electrically connected via a current metering device (114).

* * * * *